Patented Feb. 9, 1937

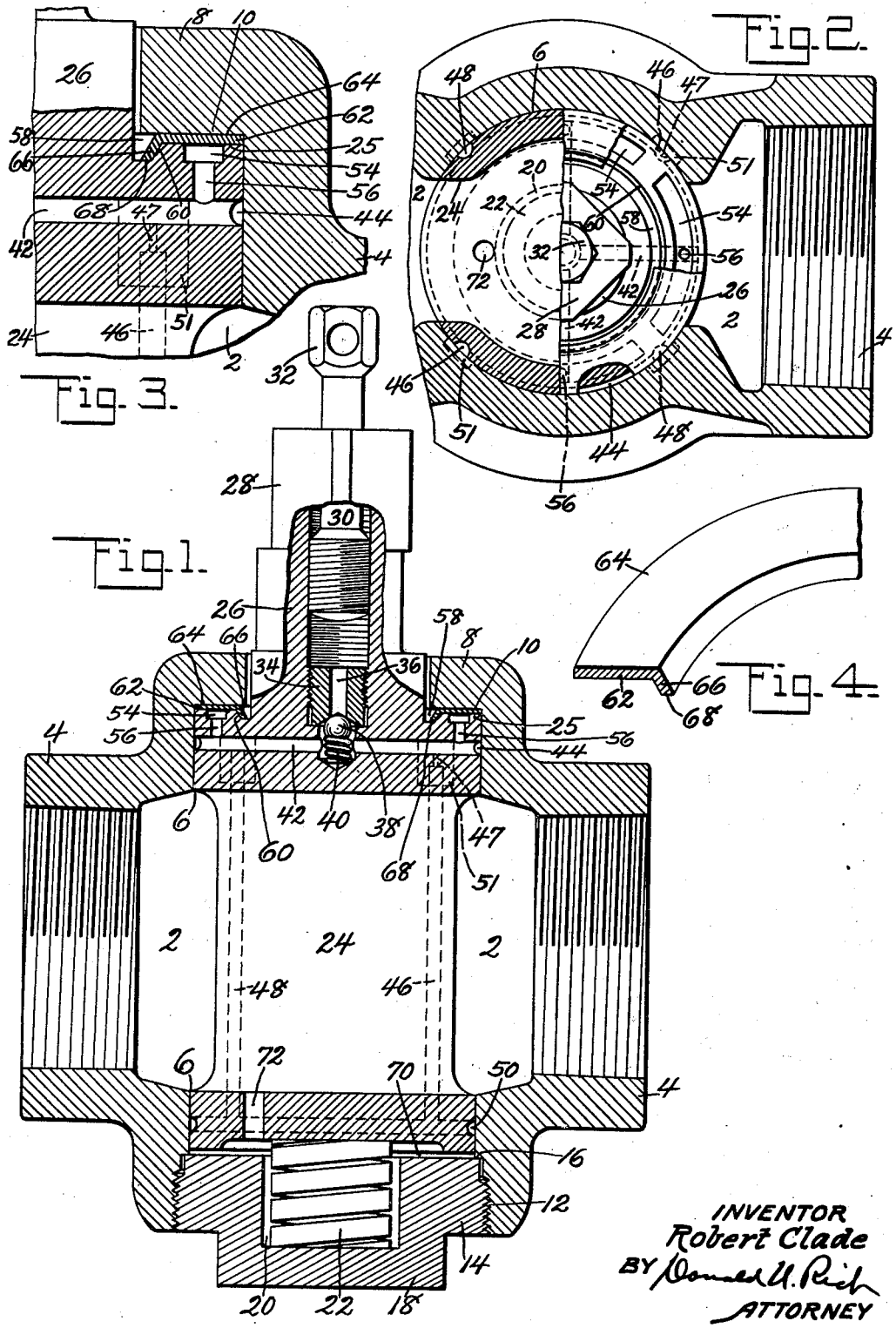

2,069,999

UNITED STATES PATENT OFFICE 2,069,999

LUBRICATED VALVE

Robert Clade, Detroit, Mich., assignor to American Car and Foundry Company, New York, N. Y., a corporation of New Jersey Application May 6, 1936, Serial No. 78,133

8 Claims. (Cl. 251—93)

This invention relates to improvements in valves in general and in particular to plug valves in which a semi-solid lubricant is forced under pressure between the contacting surfaces of the plug and body to lubricate the same.

Valves of this general type have been previously constructed wherein the valve plug shoulder has had direct contact with the casing head. Such construction required exceedingly accurate and expensive machine work and frequently did not provide sufficient area to properly retain the lubricant in the groove cut in the plug shoulder.

It is an object, therefore, of the invention to provide a valve wherein the plug and head are not in direct contact.

Another object of the invention is the provision of a valve having the plug and casing head separated by a removable member, the thickness of which may be varied.

A further object of the invention is the provision of a lubricated valve having a member interposed between the valve plug and valve head and so formed as to increase the length of the path along which the lubricant may escape from the valve.

These and other objects of the invention will be apparent to those skilled in the art from a study of the following description and accompanying drawing, in which:

Fig. 1 is a sectional view showing the valve in the open position;

Fig. 2 is a staggered sectional view showing the upper portion of the valve;

Fig. 3 is an enlarged sectional view showing the sealing means to better advantage, and Fig. 4 is a partial perspective view showing the annular sealing or wear member.

Referring now to the drawing in detail, it is seen that the valve is of conventional formation having a casing formed with ports 2, threaded pipe receiving portions 4 and plug receiving cylindrical bore 6. The cylindrical bore is partially closed at one end by overhanging head portion 8 having plane shoulders 10 and at the other end of the bore is provided with an enlarged portion having threads 12 by means of which the threaded cap 14 may be forced into engagement with the shoulder 16. The cap is provided with a wrench receiving portion 18 and a centrally located cylindrical recess 20 for the reception of spring 22, the purpose of which will be pointed out later in the description.

The cylindrical valve plug or rotatable member closely fits within the casing bore and is formed with an opening 24 which in one position of the plug will connect the ports for the flow of matter therethrough. The upper portion of the plug is formed with a shoulder 26 surrounding a centrally located stem 26 which extends upwardly through the casing head to provide a wrench receiving portion 28. The stem has a threaded passageway extending therethrough to receive a screw or ram 30 having an operating head 32 and to also receive a member 34 having a passage 36 which may be sealed by ball 38 retained in seated position by spring 40, thus forming a one-way or check valve at the lower portion of the passageway. Radially extending transverse ducts 42 connect the lower end of the passageway directly to an upper sealing groove 44 which extends completely around the plug and is in turn connected by vertical ducts 46 and 48 to the bottom sealing groove 50 which completely surrounds the base portion of the plug. The duct 46 has a restricted portion 47 which will limit the flow of lubricant in the duct at all times except when the duct is in registry with opening 51 cut in the side of the casing.

The surface of the plug shoulder 25 is interrupted at spaced intervals by short grooves 54, each connected by feeders 56 with the respective transverse duct. The surface of the plug shoulder is also interrupted by recess 58 surrounding the stem immediately adjacent thereto and this recess is formed with an outer inclined wall 60 which forms an extension of the shoulder surface. Interposed between the shoulder 10 on the head portion and the shoulder of the plug is a sealing member comprising an annulus 62 formed of metal or other resilient material which is formed with a downwardly inclined inner edge portion 66 which overlies the inclined wall 60 of recess 58. When the valve is assembled, as shown in Fig. 1, the inclined edge portion 66 closely engages the inclined wall 60. This annulus 62, as clearly shown in the drawing, effectively seals the head portion of the valve against leakage. An extension of the sealing surface is thus obtained, since any lubricant escaping from the short grooves must pass between the annulus and the plug shoulder, then change its direction of flow and pass between the annulus and the inclined wall of the recess and again change its direction of flow to escape between the edge 68 of the annulus and the bottom of the recess. It is thus seen that not only has the surface area for retaining the lubricant been increased, but the lubricant must change its direction of flow twice, which very materially retards its flow and provides an effective seal.

The valve plug has its base portion spaced slightly from the cap as at 70 in order that the plug may move downwardly when the valve is fully lubricated and the head pressure becomes sufficient to overcome the resistance of the spring and also the line pressure acting on the base of the plug through duct 72. When the valve plug shifts downwardly under the pressure of the lubricant at the head, then the annulus and the plug will separate sufficiently to permit the escape of excess lubricant, thus preventing the building up of bursting pressures within the valve.

It is obvious that certain modifications of the invention may be made such as changing the form of the annulus, the valve head or the valve plug, but such changes are contemplated as fall within the scope of the following claims.

What is claimed is:

1. In a lubricated valve, a valve body having a head portion, a valve plug rotatably mounted in said body and having an operating stem extending through the head portion, a shoulder on said plug overlapped by said head portion, a plurality of spaced lubricant grooves in said shoulder, a recess in said shoulder adjacent the operating stem, means for forcing a lubricant under pressure into the spaced grooves, sealing means interposed between said shoulder and head portion to retain the lubricant in said grooves, said sealing means extending into said recess to increase the sealing area.

2. In a lubricated valve, a valve body having a head portion, a valve plug rotatably mounted in said body and having an operating stem extending through the head portion, a shoulder on said plug overlapped by said head portion, a plurality of spaced lubricant grooves in said shoulder, a recess in said shoulder adjacent the operating stem, means for forcing a lubricant under pressure into the spaced grooves, sealing means comprising an annular metallic member interposed between said shoulder and head portion to retain the lubricant in said grooves, said metallic member having a downwardly directed portion extending into said recess to increase the sealing area.

3. In a lubricated valve, a valve body having a head portion, a valve plug rotatably mounted in said body and having an operating stem extending through the head portion, a shoulder on said plug overlapped by said head portion, a plurality of spaced lubricant grooves in said shoulder, sealing means interposed between said shoulder and head portion to retain lubricant in the spaced grooves, said sealing means being provided with a flange portion engaging a wall of said shoulder, resilient means urging said plug upwardly against said sealing means, and means for forcing lubricant under pressure into the spaced lubricant grooves, to cause axial movement of said plug in the body away from the head portion to permit escape of excess lubricant past the sealing means.

4. In a lubricated valve, a valve body having a head portion, a valve plug rotatably mounted in said body and having an operating stem extending through the head portion, a shoulder on said plug overlapped by said head portion, a plurality of spaced lubricant grooves in said shoulder, a recess in said shoulder surrounding the operating stem, sealing means interposed between said shoulder and head portion to retain the lubricant in said grooves, said sealing means extending into said recess to increase the sealing area, resilient means urging said plug upwardly against said sealing means, and means for forcing lubricant under pressure into the spaced lubricant grooves to cause axial movement of said plug in the body away from the head portion to permit escape of excess lubricant past the sealing means.

5. In a lubricated valve, a body having a head portion, a plug in said body provided with a shoulder at its upper end portion, a stem for said plug, a lubricant groove in said shoulder, the upper end portion of said plug having a recess arranged between the shoulder and stem, and a sealing member interposed between the head portion and shoulder and covering said lubricant groove with a portion thereof extended into said recess.

6. In a lubricated valve, a body having a head portion, a plug in said body having an operating stem and an annular shoulder spaced from said stem, a lubricant groove formed in the shoulder, means for forcing lubricant under pressure into said groove, and a metal sealing member interposed between the head portion and shoulder and covering said lubricant groove, said member being provided with means engaging a side wall of said shoulder to retain said member in position.

7. In a lubricated valve, a body having a head portion, a plug in said body having a stem and a shoulder at its upper end portion, a recess formed in the shoulder adjacent the stem and surrounding the latter with a wall thereof downwardly inclined, lubricant receiving grooves formed in the shoulder, an annular sealing element between the head portion and shoulder and covering said grooves, said element having a downwardly extending flange extended into said recess and arranged in contacting relation with said inclined wall, and means for forcing lubricant under pressure into said grooves.

8. In a lubricated valve, a body having a head portion, a plug in said body provided with a stem and a shoulder at its upper end portion, a recess formed in the shoulder adjacent the stem and surrounding the latter, an interrupted lubricant groove formed in the shoulder and surrounding said stem, yieldable means supporting said plug in the body, means normally sealing the head portion against leakage comprising an annular metal member surrounding the stem and interposed between the head portion and shoulder, said member covering said lubricant groove and having a sealing flange extended into said recess and arranged in contacting relation with a wall thereof, and means for forcing lubricant under pressure into said lubricant groove.

ROBERT CLADE.